May 24, 1966  J. O. HINKLE ETAL  3,252,571
DIODE ORIENTATION MACHINE
Filed Sept. 10, 1962  3 Sheets-Sheet 1
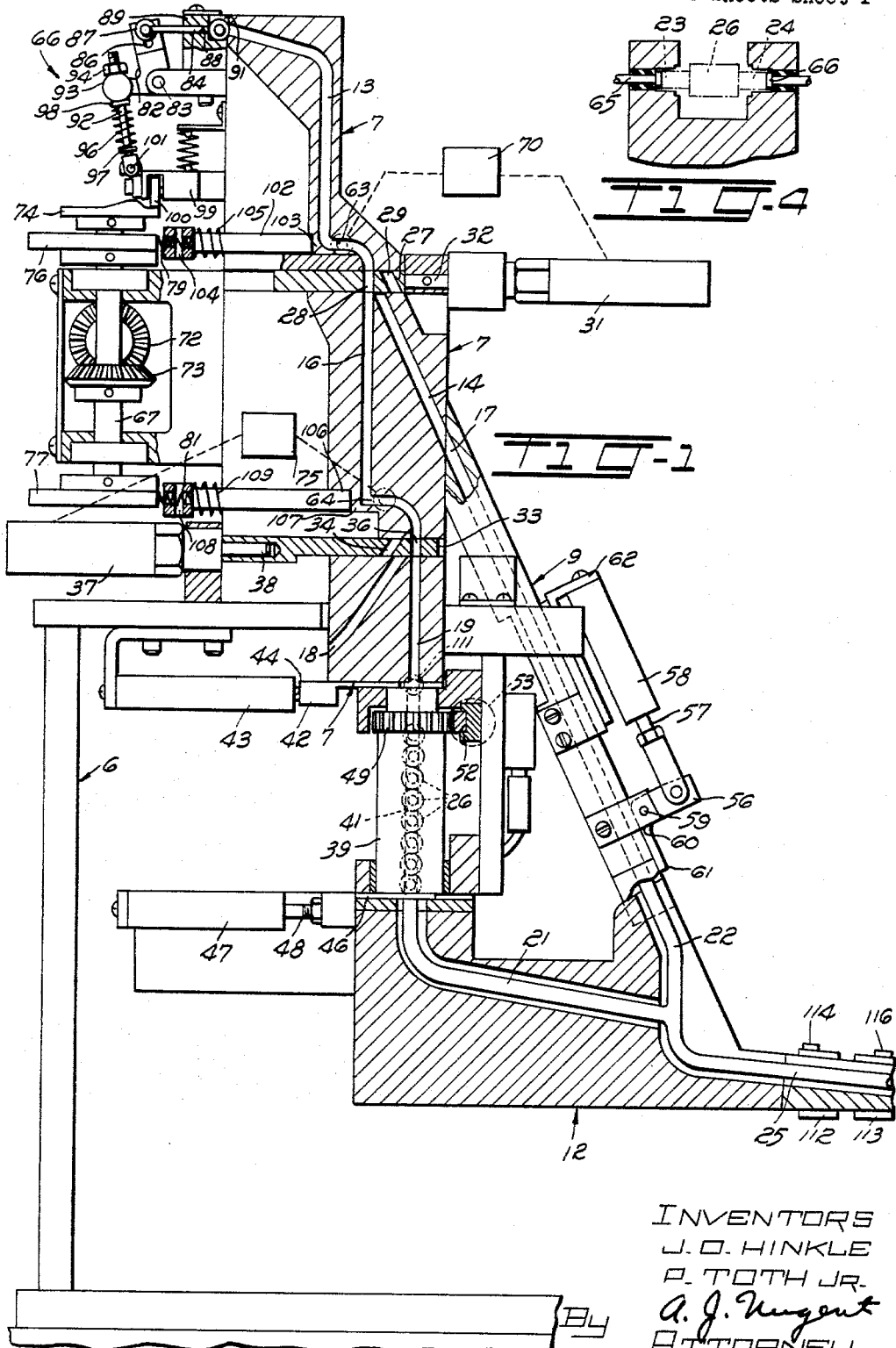
INVENTORS
J. O. HINKLE
P. TOTH JR.
A. J. Nugent
BY
ATTORNEY

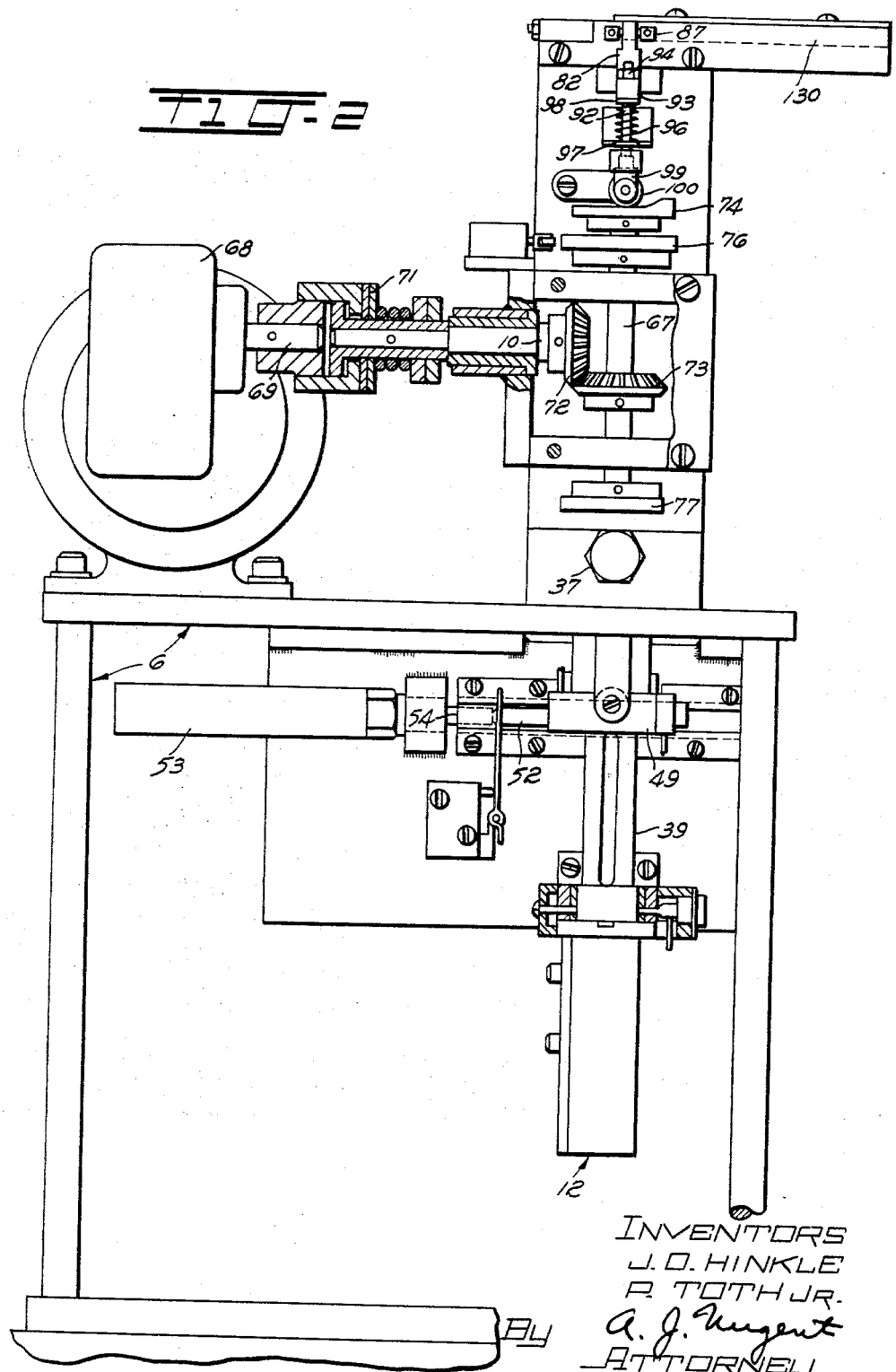

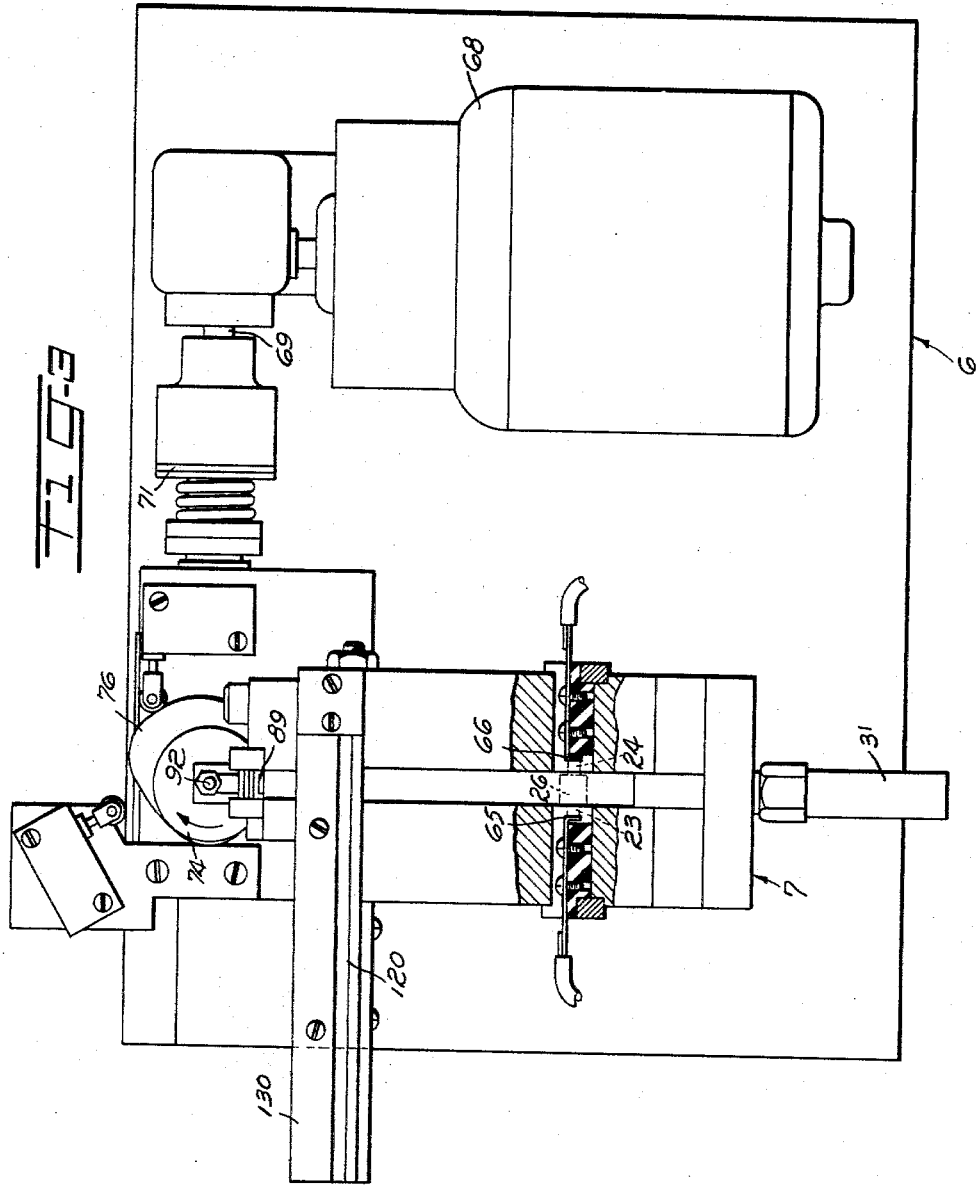

United States Patent Office 3,252,571
Patented May 24, 1966

3,252,571
DIODE ORIENTATION MACHINE
James O. Hinkle, Emmaus, and Peter Toth, Jr., Bethlehem, Pa., assignors to Western Electric Company, Incorporated, New York, N.Y., a corporation of New York
Filed Sept. 10, 1962, Ser. No. 222,564
5 Claims. (Cl. 209—81)

This invention relates to a new and improved method and apparatus for rapidly and automatically orienting physically symmetrical but electrically asymmetrical articles in a predetermined manner. More particularly, but not exclusively, the invention relates to the orientation of semiconductor devices which comprise a physically symmetrical body portion with physically symmetrical anode and cathode leads attached to the ends thereof, thereby making the orientation of the devices impossible by visual inspection alone.

As will be readily appreciated by those skilled in this art, it is essential to the economic practicality of large-scale manufacture of such devices that they be rapidly and automatically oriented in accordance with their polarity.

It is, accordingly, an object of this invention to provide for the rapid and automatic orientation of physically symmetrical but electrically asymmetrical devices in accordance with the electrical asymmetries thereof.

Another object of the invention is to provide for the rapid and automatic preliminary testing of such devices concurrent with such orientation thereof.

A further object of the invention is to provide for such orientation and testing in a manner which is especially suitable for incorporation in a substantially automated, multi-operation manufacturing process.

The above and other objects and advantages of the invention are achieved in the herein-disclosed preferred embodiment by transporting randomly oriented electrical devices, as for example physically symmetrical diodes, to a first testing means where the devices are subjected to a first electrical test to determine the orientation thereof. If the result of such test proves satisfactory, thereby indicating that the device is oriented in a predetermined manner, the tested device is passed by first directing means cooperatively associated with the first testing means directly to a final collection area. If, on the other hand, the result of such test proves unsatisfactory, thereby indicating that the device is not oriented in the predetermined manner, or is electrically unsatisfactory, the device is passed instead by the first directing means to a second testing means where it is subjected to a second electrical test to determine the reason for the failure of the first test.

If such failure is determined by the second testing means to reside in an electrically unsatisfactory device, such device is directed by second directing means cooperatively associated with the second testing means to a reject collection area. If, on the other hand, such failure is determined to have resided merely in the initial misorientation of the device, the device is instead directed by the second directing means to an intermediate collection area of relatively limited capacity. Detecting means are provided adjacent the intermediate collection area to detect the accumulation of a full supply of devices therein, and thereupon actuate reversing means to reverse the orientation of such devices, whereby the orientation thereof and the orientation of the devices passed by the first detecting means directly to the final collection area will be the same. Guide means are provided adjacent the intermediate collection area to then guide the reversed devices therefrom to the final collection area.

The above and other objects and advantages of the invention are believed made clear by detailed reference to the accompanying drawings wherein:

FIG. 1 is an end elevational view of the herein-disclosed preferred embodiment of the invention;

FIG. 2 is a front elevational view thereof;

FIG. 3 is a plan view thereof; and

FIG. 4 is a cross-sectional view of guide members of FIGS. 1 and 2.

Turning now to FIGS. 1, 2 and 3, the herein-disclosed diode orienting machine embodiment of the invention will be seen to comprise a main frame member 6 upon which are mounted, in the manner shown, guide members 7, 9 and 12, respectively; with guide member 7 including diode guide grooves 13, 14, 16, 18 and 19 formed therein, guide member 9 including diode guide groove 17, and guide member 12 including diode guide grooves 21 and 22. The cross-sectional configuration of such guide grooves is depicted in FIG. 4, whereby it may be seen that the anode and cathode leads 23 and 24 of the diodes 26 may be supported and roll conveniently in the guide grooves under the influence of the force of gravity.

Diode directing means 27 are slidably positioned in guide member 7 and seen to include diode directing grooves 28 and 29 with the former functioning, in a first position of the directing means, to connect diode guide grooves 13 and 16, and the latter, in a second position of the directing means, to connect diode guide grooves 13 and 14. To this end, double-acting air cylinder 31 is mounted adjacent directing means 27 and operatively connected thereto by connecting rod 32 whereby the directing means may be conveniently positioned by the action of the cylinder to direct diodes from guide groove 13 to either of guide grooves 16 or 14 in the manner discussed hereinbelow.

Similarly, diode directing means 33 are slidably positioned in guide member 7 and seen to include diode directing grooves 34 and 36 with the former functioning, in a first position of the directing means, to connect guide groove 16 with reject diode guide groove 18, and the latter, in a second position of the directing means, to connect guide groove 16 with guide groove 19. To this end, double-acting air cylinder 37 is mounted adjacent directing means 33 and operatively connected thereto by connecting rod 38 whereby the directing means may be conveniently positioned by the action of the cylinder to direct diodes from the guide groove 16 to either reject diode guide groove 18 or guide groove 19.

A reversing magazine 39 is rotatably positioned intermediate guide members 7 and 12, and will be seen to include diode directing groove 41 formed therein in alignment with grooves 19 and 21 of the adjacent guide members. A shutter 42 is slidably positioned atop the reversing magazine and slidable thereabove through the action of single-acting air cylinder 43 and connecting rod 44 to block the passage of diodes from groove 19 to groove 41. Similarly, shutter 46 is slidably positioned adjacent the bottom surface of the reversing magazine and slidable therebelow, through the action of single-acting air cylinder 47 and connecting rod 48, to block the passage of diodes from guide groove 41 to guide groove 21.

Further included in the reversing magazine structure is a pinion gear 49 which is fixedly attached to the upper portion of the magazine. Rack gear 52 is drivingly enmeshed with the pinion gear and driven relative thereto by the action of single-acting air cylinder 53 and connecting rod 54. Thus, it may be seen that upon actuation of cylinder 53 and corresponding movement of rack gear 52, pinion gear 49 may be driven by the latter to rotate the magazine through an arc of 180° to reverse the orientation of the diodes contained in the reversing groove.

A blocking member 56 is pivotally mounted at 59 on guide member 9 by mounting flange 60 and so positioned relative to the guide member that the end portion 61 of blocking member 56 is movable into guide groove 17 to block the passage of diodes therethrough. To this end, single-acting air cylinder 58 is positioned on guide member 9 by mounting flange 62 adjacent the pawl member and connected thereto by connecting rod 57. Thus, it may be seen that actuation of the air cylinder and corresponding movement of the connecting rod 57 toward blocking member 56 will result in the end portion 61 of the latter being pivoted about the point 59 into guide groove 17.

Included in guide grooves 13 and 16 are seen diode test contacts 63 and 64, respectively. Such contacts will be seen in FIGS. 3 and 4 to each comprise a pair of electrodes 65 and 66 positioned in the manner shown in the side walls of the respective grooves whereby electrical contact may be established with the anode and cathode leads of a diode located therebetween.

Electromechanical test and control circuits, schematically indicated at 70 and 75, are connected across each of the test contacts 63 and 64 and to air cylinders 31 and 37, respectively, whereby the orientation of diodes located between the respective contacts may be electrically determined and the respective air cylinders actuated accordingly. Thus, test and control circuit 70 is designed to actuate air cylinder 31 to move diode directing means 27 to the left in FIG. 1 and connect diode guide groove 13 to diode guide groove 14 through diode directing groove 29 only if the diode located between test contacts 63 is oriented in the forward direction and is not an open or shorted unit. Similarly, test and control circuit 75 is designed to actuate air cylinder 37 to move directing means 36 to the left and connect diode guide grooves 16 and 19 through diode directing groove 36 only if the diode positioned between test contacts 64 is oriented in the reverse direction and is not an open or shorted unit. In the event that the diode is an open or shorted unit, both diode directing means will in turn be moved to the right by the action of the respective test contacts, test and control circuits, and air cylinders, whereby such diode will automatically be directed from diode guide groove 13 to diode guide groove 16 by directing groove 28 and thence to reject diode guide groove 18 by directing groove 34. As a failsafe feature, test and control circuits 70 and 75 are further designed to always return diode directing means 27 to the position connecting diode guide grooves 13 and 16, and diode directing means 33 to the position connecting diode guide grooves 16 and 18 at the completion of the testing of each diode to insure rejection of a diode in the event of failure at either test position.

A feeding and gating device is indicated generally at 66 and is seen to comprise cam shaft 67 rotatably driven by electrical motor 68 through shaft 69, slip clutch 71, shaft 10, and meshed bevelled gears 72 and 73. Cams 74, 76 and 77 are positioned on the cam shaft as shown and rotatable therewith to reciprocate cam followers 100, 79 and 81 upon rotation of the cam shaft. Bell crank 82 is pivotally mounted on guide member 7 at 83 and will be seen to include feed fingers 84 slidably positioned in slot 86 of the bell crank by holding elements 87. The feed fingers are further slidably mounted in slots 88 of diode entry guide element 89 so as to be slidable, upon pivotal movement of the bell crank about point 83, into and out of diode entry slot 91 in the diode entry element. Actuating rod 92 is slidably mounted at one end of the bell crank with freedom for transverse movement in end portion 93 thereof and maintained therein by fastening element 94. The actuating rod is spring biased away from the bell crank by biasing spring 96 positioned and maintained around the rod between fixed stop element 97 and slidable stop element 98. The other end of the rod is pivotally mounted on spring-based cam follower support 99 at 101 in the manner shown. Thus, it may be seen that rotation of cam 74 and attendant reciprocation of cam follower 100 and cam follower support member 99 will effect pivotal movement of bell crank 82 about point 83 through the respective action of spring-biased slidable stop element 98 and fastening element 94 against the end portion 93 of the bell crank. Such pivotal movement of the bell crank may further be seen to result in slidable movement of feed fingers 84 in diode entry guide element 89 into and out of diode entry slot 91 whereby diodes may in turn be pushed by the feed fingers from the entry slot into diode guide slot 13. Diodes may be fed, positioned as shown in FIGS. 1 and 3, in any convenient manner to the groove 120 in diode entry track 130 and thence to the entry slot 91. For example, a vibratory bowl feeder operatively connected to diode entry track 130 may be utilized for this purpose.

Diode slide member 102 is slidably positioned within slot 103 in guide member 7 in the manner shown, with one end of the slide positioned adjacent test contacts 63 and slidable therebetween into the interior of guide groove 13, and the other end thereof including shaft 104 upon which is rotatably mounted cam follower 79. The slide is spring biased toward the cam by spring 105. Similarly, diode slide member 106 is slidably mounted in slot 107 in guide member 7 with one end of the slide positioned adjacent test contacts 64 and slidable therebetween into guide groove 16, and the other end thereof including shaft 108 upon which is rotatably mounted cam follower 81. Slide member 106 is also spring biased toward the cam which actuates the same by the action of spring 109. The slide members function, upon actuation by cams 76 and 77, respectively, to push single diodes into position between the respective test contacts 63 and 64 located adjacent such members.

Phototransistor detecting means 111 are situated as shown adjacent the upper extremity of reversing magazine 39 and positioned relative thereto to insure that the last of a full supply of diodes within reversing groove 41 will, upon the entry thereof into the groove, interrupt the beam of light, and thus modify the operational characteristics thereof. The detecting means are further connected, through non-illustrated electromechanical control circuits, to each of single-acting air cylinders 43, 47, 53 and 58, in such manner that the operation of the cylinders is controlled in response to changes in the operational characteristics of the said means.

Accordingly, it may be seen that upon the accumulation of a full supply of diodes within the reversing groove, and the attendant interruption of the beam of light which actuates the phototransistor detecting means, the resultant change in the operational characteristics of the said means may be utilized to actuate, in the following order, air cylinder 43 to move shutter 42 to the right and momentarily block the passage of further diodes into the reversing groove from guide groove 19, air cylinder 58 to pivot end 61 of blocking member 56 into guide groove 17 to momentarily block the passage of diodes therefrom into final guide groove 25, and air cylinder 53 to rotate the reversing magazine 180° through the medium of the rack and pinion gears connected therebetween. Upon the completion of such rotation, it may be appreciated that the orientation of the diodes accumulated within the thusly rotated reversing groove and the orientation of the diodes passed directly by directing means 27 to final guide groove 25 through guide grooves 14, 17 and 22, will be the same, whereupon air cylinder 47 may be actuated to momentarily move shutter 46 to the left and enable passage of the now properly oriented diodes from the reversing magazine to final guide groove 25 through guide groove 21.

Upon the expiration of a predetermined period of time sufficient to enable all of the diodes within the reversing groove to pass therefrom into groove 21, blocking member 56, shutters 42 and 46 and reversing magazine 39, may be returned to the positions thereof depicted in FIG. 1 by further action of the respective air cylinders connected thereto, whereupon the accumulation of misoriented diodes within the reversing groove, and passage of properly oriented diodes from guide groove 14 to final guide groove 25 through guide grooves 17 and 22, may again take place.

Phototransistor detecting means 112 and 113, including light sources 114 and 116, respectively, are situated as shown adjacent final guide groove 25 and function to detect the level of the supply of properly oriented diodes therein. Such detecting means are each connected, by non-illustrated connecting means, to driving motor 68 whereby the operation of the device of the invention may be temporarily discontinued or restarted by temporarily discontinuing or restarting the operation of the driving motor in the following manner. When the level of diodes within final guide groove 25 reaches and steadily interrupts the beam of light of detecting means 112, thus indicating a substantial backup in the supply of properly oriented diodes in the groove, such condition is utilized through connecting means 131 to temporarily discontinue the operation of driving motor 68. Conversely, when the level of diodes within the final guide groove falls to the right of the beam of light of detecting means 113, thereby indicating a substantial depletion in the supply of properly oriented diodes within the groove, such condition is utilized through connecting means 132 to restart driving motor 68 to again bring the device of the invention into operation and replenish such supply.

In operation, power is supplied to driving motor 68 whereby fingers 84 and slide members 102 and 106 will be driven, through the cam shaft and bell crank arrangement, to reciprocate into and out of the diode entry slot 91 and diode guide grooves 13 and 16, respectively.

Concurrently therewith, the feed of diodes in any convenient manner to the diode entry slot is commenced whereupon the first diode to reach and enter the entry slot is pushed therefrom by the feed fingers into diode guide groove 13 and will roll freely therein under the force of gravity until halted by the abutment of the anode and cathode leads thereof with the protruding electrodes 65 and 66 of tests contacts 63. Test and control circuit 70 is completed by such abutment whereby it is determined electrically whether the diode is oriented in the forward or reverse direction, and the directing means 27 positioned accordingly through the action of double-acting air cylinder 31 to direct the diode, if oriented in the forward direction and electrically satisfactory, to final guide groove 25 or, if oriented in the reverse direction or electrically unsatisfactory, to guide groove 16. Another reciprocatory cycle of feed fingers 84 and slide members 102 and 106 follows, whereby a second diode is pushed into guide groove 13 from the entry slot and the just-tested diode pushed past electrodes 65 and 66 of test contacts 63 by the action of slide 102. If the just-tested diode proved to be oriented in the reverse direction or electrically unsatisfactory, it will be directed to and roll freely in guide groove 16 until halted by abutment with the protruding electrodes 65 and 66 of test contacts 64 whereupon test and control circuit 75 will be completed, the diode again tested, and directing means 33 positioned accordingly to direct the diode, if oriented in the reverse direction and electrically satisfactory, to reversing groove 41 or, if electrically unsatisfactory, to reject diode guide groove 18. The next reciprocatory cycle of gating fingers 84 and slide members 102 and 106 follows, whereby the now twice-tested diode will be pushed past the electrodes of test contacts 64 and roll freely to the reject diode guide groove 18 or reversing groove 41. Concurrently therewith, another diode will be pushed into guide groove 13 from the entry slot by the gating fingers, while the preceding diode just tested at test contact 63 is pushed therepast by slide 102 and the entire cycle repeated.

Upon the accumulation of a full supply of diodes in reversing groove 41 and the detection thereof by phototransistor detecting means 111, shutter 42 is moved to the right by single-acting air cylinder 43, reversing magazine 39 is rotated 180°, shutter 48 is moved to the left by air cylinder 47, and end portion 61 of blocking member pawl 56 is pivoted into guide groove 17 to momentarily halt the passage of diodes therethrough, whereby the diodes accumulated in the reversing groove are thus provided unobstructed passage to final guide groove 25 through guide groove 21.

Various modifications may be made in the hereindisclosed embodiment of the invention without departing from the spirit and scope thereof.

What is claimed is:

1. In a device for orienting diodes in a predetermined manner so that the respective anode and cathode leads thereof face in the same respective directions, support means including a plurality of diode guide grooves formed therein and operative to guide diodes from a first location to at least a second location, diode feed means operatively connected to a first of said guide grooves at said first location and operative to feed randomly oriented diodes thereto, diode test circuit means including a pair of electrical contacts positioned in the walls of said first guide groove and operable to make electrical contact with diodes positioned therebetween in said groove and determine electrically the orientation of the anode and cathode leads thereof, directing means operatively connected to said test means and slidably positioned between said first guide groove and a second and third of said guide grooves and slidable to at least two positions therebetween, said directing means comprising at least one directing groove alignable with said first and second guide grooves and at least one directing groove alignable with said first and third guide grooves whereby diodes may be selectively directed thereby from the first guide groove to either of the second or third guide grooves, and a rotatable reversing magazine including a portion of said third guide groove and operable upon the rotation thereof to reverse the orientation of diodes contained within said portion and thence guide the thusly reversed diodes to the second location.

2. In a machine as in claim 1, further including, a third location to which articles may be guided from the first location by the guide grooves, diode test means including a pair of electrical contacts positioned in the walls of said third guide groove and operable to make electrical contact with diodes positioned therebetween in said groove and determine electrically the orientation of the anode and cathode leads thereof, directing means operatively connected to said test means and slidably positioned in said third guide groove and slidable to at least two positions therein, said directing means comprising at least one directing groove alignable with said third guide groove only and at least one directing groove alignable with said third guide groove and said third location.

3. In a machine for orienting electrically asymmetrical articles in a predetermined manner in accordance with the electrical asymmetries thereof:

a plurality of operatively interconnected article support guide means having grooves therein for guiding said articles from a first location to at least a second location, feed means operatively connected to a first of said guide means at said first location and operative to feed articles thereto, operatively connected test and directing means included in said first guide means and operative to determine the orientation of articles therewithin in accordance with the electrical asymmetries thereof and direct the articles therefrom to a second of said guide means if oriented in the predetermined manner or to a third of said guide means if not oriented in the predetermined manner, said second and third guide means both being operative to guide articles thusly directed thereto to the second location, the test means including a pair of electrical contacts located in the walls of said guide means and operative to make electrical contact with articles positioned therebetween in the groove, and the directing means including a slidable element having at least one article directing groove selectively alignable with the guide grooves in the first and second or first and third guide means, and rotatable reversing means included in said third guide means and operative upon the rotation thereof to reverse the orientation of articles directed thereto from the first guide means, and thence guide said articles to the second location.

4. Apparatus for testing and orienting electrically asymmetrical components in accordance with the electrical asymmetries thereof, comprising:

support means including a plurality of grooves formed therein for guiding a succession of components from a first location to at least a second location, test circuit means mounted on said support means intermediate said first and second locations operable to determine electrically the orientation of electrical components fed thereto in accordance with the electrical asymmetries thereof, directing means operatively connected to said test circuit means operable to allow properly oriented components to move directly to said second location and improperly oriented components to move to a second of said guide grooves, a rotatable magazine including a portion of said second guide groove operable to stop and store improperly oriented components which have moved to said second guide groove, detecting means operatively connected to said rotatable magazine operable to detect when a predetermined number of improperly oriented components have been fed to the magazine, and means responsive to detection of said predetermined number of improperly oriented components in said magazine for rotating said magazine to a position where the components are properly oriented.

5. Apparatus for testing and orienting electrically asymmetrical electrical components in accordance with their polarity, which comprises:

support means including a plurality of grooves formed therein for guiding a succession of components from a first location to at least a second location, test circuit means mounted in said support means intermediate said first and second locations operable to determine electrically the orientation of the poles of electrical components fed thereto, directing means operatively connected to said test circuit means operable to allow properly oriented components to move directly to said second location, and improperly oriented components to move to a second of said guide grooves, means mounted in said support means for rotating improperly oriented components to a position where they are properly oriented, including:

a first shutter operable to be moved from a normal position blocking said second guide groove to an open position, a second shutter operable to be moved from a normally open position to a closed position where it blocks the guide groove, a magazine rotatably mounted in said support means between said first and second shutters and including therein a portion of said second guide groove, means connected to said magazine operable to detect when a sufficient number of components have been fed to the magazine to fill it, and means connected to said detecting means, first shutter, second shutter and magazine, operable, upon detection of a full magazine, to close the second shutter, rotate the magazine to a position where the components held therein are properly oriented, and open the first shutter, allowing the components in the magazine to move to said second location.

References Cited by the Examiner

UNITED STATES PATENTS

| | | | |
|---|---|---|---|
| 2,468,843 | 5/1949 | Sunstein | 209—81 |
| 2,652,139 | 9/1953 | Baehr | 198—33.2 |
| 3,073,446 | 1/1963 | Wilson | 209—81 |

FOREIGN PATENTS 447,705   5/1936   Great Britain.

ROBERT B. REEVES, *Primary Examiner.*

M. HENSON WOOD, JR., *Examiner.*

ERNEST A. FALLER, RICHARD A. SCHACHER,
*Assistant Examiners.*